Patented Aug. 11, 1942

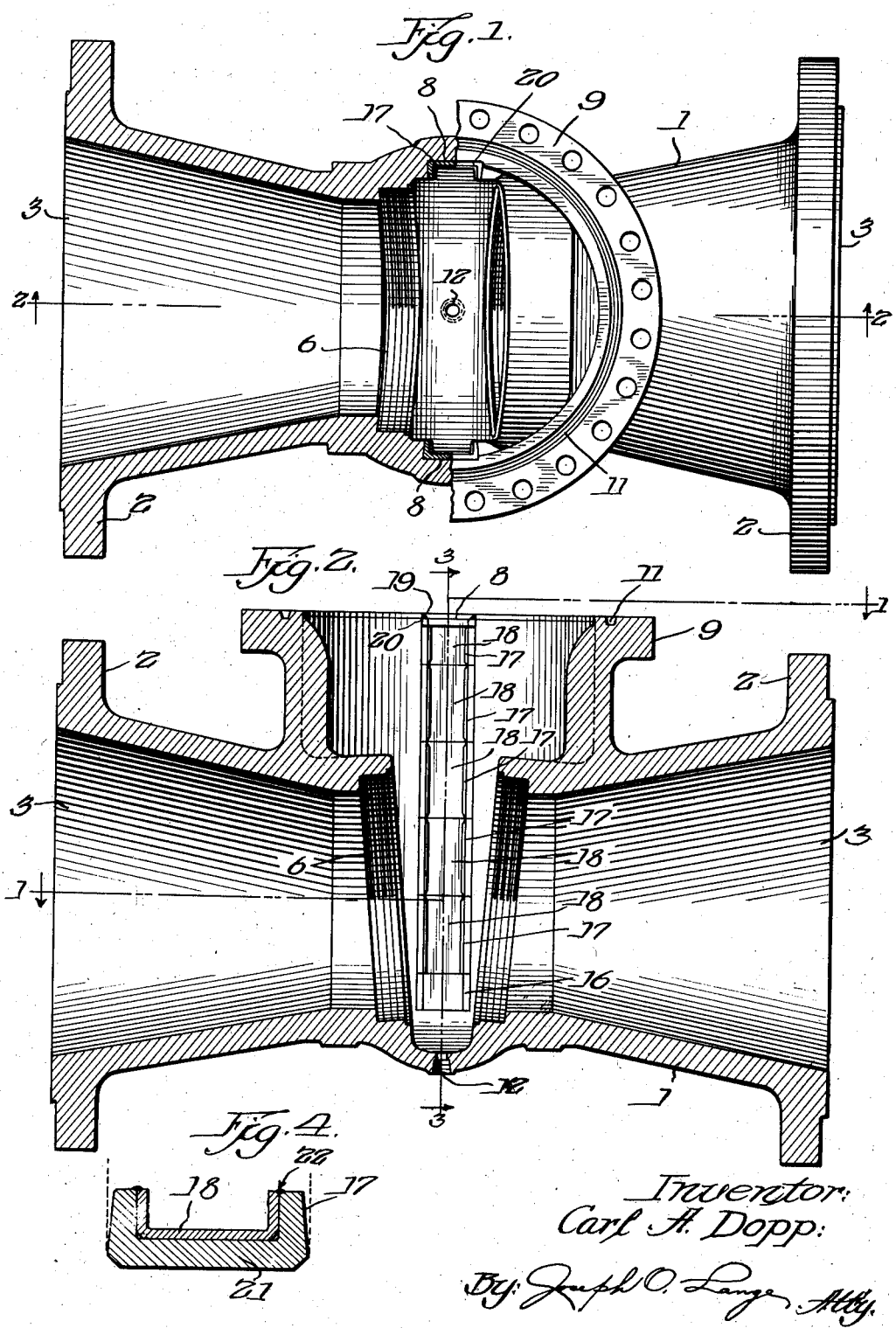

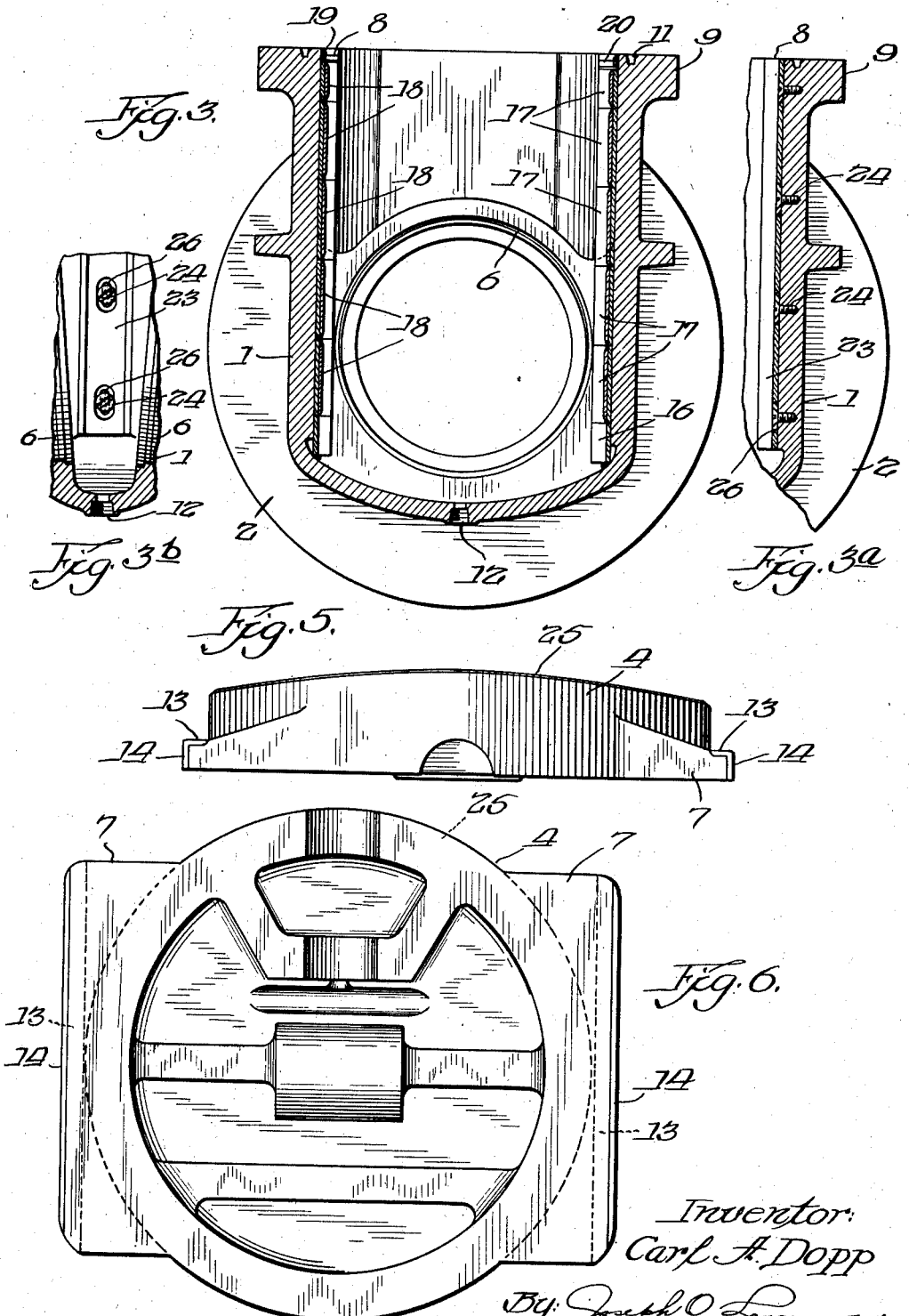

2,293,016

UNITED STATES PATENT OFFICE 2,293,016

VALVE

Carl A. Dopp, Chicago, Ill., assignor to Crane Co., Chicago, Ill., a corporation of Illinois Application February 14, 1941, Serial No. 378,849

9 Claims. (Cl. 308—3)

In connection with valves, and more especially with valves constructed for services involving high pressures and high temperatures, there has long existed a serious problem of providing satisfactory means for guiding the closure member to and from the seated position. Such guide means usually takes the form of sidewardly extending ribs or bosses on the closure member which are fitted slidably within a vertical slot or channel ordinarily formed in each side of the valve body or casing. Other methods represent slight variations of this construction but are fundamentally similar. The pressure and velocity forces acting transversely against the closure member during its opening and closing movements create tremendous sliding loads on the surfaces of the aforementioned closure member ribs and body guide slots or grooves. To minimize the wear resulting from these sliding loads it is sometimes customary to cover the wearing surfaces on the closure member ribs with an overlay of hard-facing material, as for example a cobalt-chromium-tungsten alloy. The best results, of course, would be obtained by hard-facing both the closure member ribs and the wearing surfaces in the body but provision for the latter construction has presented so many practical difficulties that, to my knowledge, no one has produced a valve having hard-surfaced guide grooves within the body. In fact, the demand for extremely high temperature and high pressure valves requiring such wear-resistant guides has been practically negligible until the advent of extremely high pressure and high temperature power plants and oil refineries within only the past few years. One of the major difficulties connected with depositing hard-surfacing metal onto the walls of a longitudinal guide groove within a valve body lies in the fact that the commercial hard-surfacing alloys have a coefficient of thermal expansion sufficiently different from that of the usual low carbon valve steels that such an overlay would be likely to crack or break off when the valve was subjected to fluctuating temperatures in service due to the difference in the expansion rates of the joined materials and due also to the extreme brittleness which is characteristic of the hard-surfacing alloys. Another difficulty lies in the fact that generally in hard-surfacing methods the parent metal must be preheated which would be a long and tedious task requiring the use of specialized equipment. Another difficulty lies in the problem of machining the hard-surfacing material even assuming that it could be applied with the assurance that it would not crack in service. Another difficulty lies in the fact that in the event of failure of the hard metal overlay in service, repair would require the services of a skilled welder experienced in the specialized field of hard facing and would very likely be time-consuming as well as otherwise expensive.

Therefore, a broad object of my invention is an improved method of providing hardened inner surfaces within the guide slots or channels in a valve casing.

Another object is the provision of a valve body having guide slots lined with a number of removable hardened sections of either channel- or U-shaped cross-section or the like, in order to facilitate the manufacture of the valve and also to render repair or replacement of the hardened surfaces relatively easy in the hands of unskilled workmen simply by replacing any of the removable hardened sections with pre-formed duplicates.

Still another object lies in the provision of a segmented wear-resistant guide for a valve closure member which may be easily removed and re-assembled without welding or otherwise utilizing highly skilled labor or special equipment, thus making possible the repair of the guide in remotely located installations having only limited facilities available.

A further object is the provision of multi-piece liners having surfaces of wear-resistant material positioned removably within the guide slots of a valve body.

Yet another object lies in the provision of an inexpensive, simple, rugged, and wear-resistant valve guide preferably made in units or which may be made as a single renewable liner easily assembled or repaired when required.

Still a further object provides for a wear-resistant hard-faced liner for a valve body guide slot, the liner and the body having a metal of intermediate thermal expansion interposed between the two.

Other objects and advantages will become more readily apparent to one skilled in the art of valves on considering the following detailed description which is to be taken in connection with the drawings, in which Fig. 1 is a fragmentary sectional top view of a gate valve incorporating one form of my invention.

Fig. 2 is a vertical sectional view of the construction shown in Fig. 1 and taken on the line 2—2 of Fig. 1.

Fig. 3 is a vertical sectional view of Fig. 2 taken on the line 3—3 of Fig. 2.

Fig. 3a shows another modification of my invention as it might be applied to Fig. 3.

Fig. 3b is a partial exterior view, taken within the valve, of the detailed guide means shown in Fig. 3a.

Fig. 4 is an enlarged transverse sectional view of one of the guide slot liners shown in Figs. 1, 2 and 3.

Fig. 5 is a plan exterior view of one of a pair of closure members which may be employed with the valve body shown.

Fig. 6 is a vertical exterior rear view of the disc shown in Fig. 5.

Like parts are designated by the same reference characters in all figures throughout the drawings.

The valve casing or body 1 is provided with the usual flange connections 2 for suitable connection with a pipe-line (not shown). While flange connections are shown it is obvious that other means for making the assembly with a pipe-line may also be used without departing from the scope of this invention.

The valve casing is provided with the usual through-ports 3 extending linearly from one end to the other. Flow therethrough is normally controlled in the usual manner by means of a pair of suitable disc-shaped closure members 4, such as that shown in Figs. 5 and 6, which cooperate with a pair of ring-shaped seat members (not shown) which are threaded and screwed into engagement with the threads 6 formed in the casing 1. Of course, the seat members may be dispensed with, if desired, and the seats may be made integral with the casing. The disc ribs or extensions 7 (see Fig. 5) fit within the body slots 8 to guide the discs or closure members 4 in their upward and downward travel in opening and closing the valve. The usual bonnet (not shown) with its stem-journalling function is connected to the bonnet flange 9 of the casing 1 and serves primarily to suspend the stem and discs operably within the casing 1. The annular groove 11 normally contains the usual sealing ring (not shown) although any type of joint may be used without significance. A threaded opening 12 is provided in the lower part of the casing 1 to furnish a drain opening for the release of sediment and scale that may collect between the discs 4.

When such a valve is to be used on high pressures and temperatures, the disc rib surfaces 13 and 14 which are subjected to the very heavy sliding loads referred to may advantageously be provided with a wear-resistant hard-surfacing overlay of metal as indicated in Fig. 5, in addition to similar wear-resistant overlays on the body seat rings (not shown) and the seating surfaces 25 of the discs 4.

My novel contribution to the art, however, resides in the provision of a wear-resistant surface within the body guide slots 8 by first machining the slots preferably in the dove-tailed manner shown in Fig. 1, that is with the bottom of each slot slightly wider than the top. Then a reasonably snug-fitting, similarly dove-tailed channel section 16 is introduced into the upper open end of the guide slot 8 adjacent the face of the bonnet flange 9 and is forced down through the slot to the bottom of the valve, as shown more clearly in Figs. 2 and 3. The channel section 16 preferably extends below the lowermost position of the disc rib 7 even when in the seated or fully closed position, and thus it is unnecessary to provide the channel section 16 with a wear-resistant inside layer. The channel section 16 serves primarily as a bottoming or supporting member for the similar upper units comprising superposed sections and it may or may not be tack-welded to the casing, as indicated at 16 in Fig. 3. Similar channel sections, each generally designated 17 and having an inner liner 18 of wear-resistant material, are introduced within the guide slot 8 above the section 16. The section introduced last, designated 20, is similar to section 16 in the respect that it has no wear-resistant liner since the uppermost portion of the disc rib 7 never rises that high even when in the fully open position. Tack welding 19 is preferably applied to maintain the section 20 firmly in place and to prevent undue movement of the sections 17 subsequently when the disc 4 is moved in opening and closing under pressure.

In the channel sections generally designated 17, the liner 18 may optionally be joined to the back-up member or shoe 21 by tack-welding as at 22 (see Fig. 4) at the junction of the materials, or may be joined by silver-soldering, brazing, or attached in any other suitable manner.

In order to allow for lengthwise expansion of the sections within the guide slot due to high temperature service, it is preferable, although not necessary, that a little clearance should be left between each so that upon the occurrence of thermal expansion the sections may elongate and fill the space between each without stressing objectionably the hard-surfacing material to the point of failure. In the latter connection, another method used involves the construction of the sections with the shoe portions of a material having a coefficient of expansion less than that of the body or casing material. It is obvious, of course, that if the liner 18 is to be attached firmly to the shoe portion 21 by welding, brazing or the like, the two must have thermal coefficients reasonably close to one another to prevent undue stresses from being built up between the two materials. If it is necessary or desirable, however, to employ liner and shoe materials having substantially different thermal coefficients, axial movement with respect to one another must be provided, as for instance, by dove-tailing the liner 18 into the shoe 21 in much the same manner as the shoe is dove-tailed into the body 1. Or, alternately, the liner and shoe may be bolted or screwed together, with axially elongated bolt holes being provided in either the liner or the shoe to allow for limited axial movement of the one with respect to the other. Likewise, it should be obvious, too, that a similar bolt and elongated bolt-hole fastening device may advantageously be employed for connecting the shoe onto the casing in which case the dove-tailing already referred to may or may not be used as this is, of course, optional.

Another useful modification may be constructed by making the sections 17 each of a single piece of wear-resistant alloy, but due to the extreme cost of these alloys it will usually be best from the economic standpoint to make it in two pieces, as shown, the cost being minimized by making the liner as thin as possible and securing strength by means of a back-up shoe.

Fig. 3a shows an alternative means for fastening a wear-resistant liner within a guide slot, the liner 23 being in this case in one piece and fastened to the casing 1 by means of the screws 24. To allow for linear expansion of the liner 23 upon being subjected to high temperatures within the valve, it is provided with the longitudinal bolt holes 26. An elevation view, taken inside the valve, of the liner 23 showing a pair of these elongated bolt holes 26 is shown in Fig. 3b.

Briefly, and in broad, general language, I have described my invention as consisting of a novel hard-facing insert suitable for functioning as a valve body guide which may be constructed outside the body and subsequently inserted therewithin during initial assembly or in later repair operations.

While I have not described in detail all the specific modifications of my invention which may readily occur to one skilled in the art in light of the disclosures herein made, I nevertheless do not desire to be limited to the specific constructions herein set forth but merely to be limited within the spirit and scope of the appended claims.

I claim:

1. In a guide of the character described for valves or the like, the said guide comprising a plurality of removable axially superposed channel members having hardened interior surfaces and dovetailed exterior surfaces, all of said surfaces being parallel to the longitudinal axis of said guide.

2. The combination of guide means of the class described, a member axially movable within a casing, the said guide means being adapted to be removably associated with the said casing and comprising a plurality of axially aligned members, the said latter members having hardened inner surfaces for slidable contact with said first named axially movable member and each having an open side whereby said axially movable member may extend transversely into slidable contact with said hardened inner surfaces.

3. Guiding means within a casing, the said guiding means comprising a plurality of grooved axially superposed internally hard faced shoes of substantially U-shaped cross-section adapted to be removably positioned within grooves formed in the said casing, the said shoes being severally removable from the said casing.

4. A guide of the character described, the combination of a housing for the said guide, the said guide comprising a plurality of axially aligned channel members superposed upon one another and adapted to be removably positioned upon an inner surface of said housing, each of the said channel members comprising respectively an outer U-shaped element and an inner U-shaped liner element of hard material positioned within said outer element, the former element being formed to engage the said housing, the inner of the said elements being adapted to provide a slidable contact for a reciprocably movable member within the said housing.

5. Guiding means of the class described, comprising a housing, a plurality of separable axially superposed channel members, each of said channel members comprising an outer substantially dovetailed longitudinal element, and an inner substantially dovetailed longitudinal element of hard material within the said outer element, the said elements being joined by fusion, said outer longitudinal elements being associated with said housing by interlocking means which allow for limited axial movement of said channel members, but substantially restrict movement transverse to the longitudinal axis thereof.

6. Guide means of the character described for valves or the like, comprising a housing, a number of axially superposed removable guiding elements, each of the said elements comprising outer and inner channel-shaped members whose longitudinal axes are substantially parallel, the said channel-shaped members being axially movable with relation to one another, said guiding elements being associated with said housing by interlocking means which allow for limited axial movement thereof, but substantially restrict movement transverse to the longitudinal axis thereof.

7. A guiding device of the character described comprising a plurality of separate and removable channel-shaped members axially superposed one upon the other in a housing, each of the said channel-shaped members consisting of an inner and an outer longitudinal member the latter being of dovetailed cross-section, each of the said dovetailed members being of a material having substantially the same coefficients of thermal expansion, said outer longitudinal member being associated with said housing by interlocking means which allow for limited axial movement thereof, but substantially restrict transverse movement.

8. Guiding means of the character described adapted to fit within a beveled longitudinal slot in a housing, the said guiding means consisting of an outer channel-shaped member having beveled outer surfaces parallel to the longitudinal axis thereof, and an inner channel-shaped member of hard wear-resistant material, whereby movement of said outer member within said slot is restrained substantially to axial movement in a direction parallel to the said slot.

9. The combination of a guide in a housing with dovetailed grooves therein, a reciprocating member in the said housing, the said guide comprising a plurality of axially superposed channel members of hard material each having an outside dovetailed surface adapted to be received within the dovetailed grooves formed in the said housing, the said channel members being restrained against outward movement at the ends of said grooves but having sufficient space between the ends of one another within said grooves that said channel members may be limitedly movable with respect to said housing under the influence of unequal thermal expansion or contraction of the housing with respect to said guide induced by temperature changes, whereby distortion and breakage of said guide due to thermal shock or the like is substantially minimized.

CARL A. DOPP.